United States Patent [19]

Koren et al.

[11] Patent Number: 4,625,600
[45] Date of Patent: Dec. 2, 1986

[54] LUG REMOVAL/INSTALLATION DEVICE

[76] Inventors: Robert W. Koren, 4855 Boston Ave.; James T. Koren, 4726 Cypress Ave., both of Trevose, Pa. 19047

[21] Appl. No.: 771,698

[22] Filed: Sep. 3, 1985

[51] Int. Cl.[4] .............................................. B25B 23/00
[52] U.S. Cl. ...................................... 81/462; 81/180.1
[58] Field of Search ................................ 81/462, 180.1

[56] References Cited

FOREIGN PATENT DOCUMENTS

| | | | |
|---|---|---|---|
| 2501336 | 1/1975 | Fed. Rep. of Germany | 81/462 |
| 2517934 | 11/1976 | Fed. Rep. of Germany | 81/462 |
| 2733183 | 7/1977 | Fed. Rep. of Germany | 81/462 |
| 2815845 | 10/1979 | Fed. Rep. of Germany | 81/462 |
| 1536907 | 6/1976 | United Kingdom | 81/462 |

Primary Examiner—Frederick R. Schmidt
Assistant Examiner—Maurina Rachuba
Attorney, Agent, or Firm—Frank A. Follmer

[57] ABSTRACT

A device for use in conjunction with a lug wrench in the removal or installation of vehicle wheel lugs is constructed of a main vertical support, a secondary vertical support and a base pivotally connected at end portions thereof, the free end portions of the base and secondary support being arranged to be releasably fastened so as to position said members in a triangular configuration with the base support on the ground and the vertical support members extending upwardly therefrom, the main vertical support having slots therein spaced apart along the length thereof to provide bearing surfaces for supporting a horizontal portion of the lug wrench. The device is adapted to function as a reflective hazard warning device by the provision of reflective strips on side portions of the members. The device can be folded into a small and lightweight package for ease of storage.

12 Claims, 10 Drawing Figures

U.S. Patent    Dec. 2, 1986    Sheet 1 of 3    4,625,600
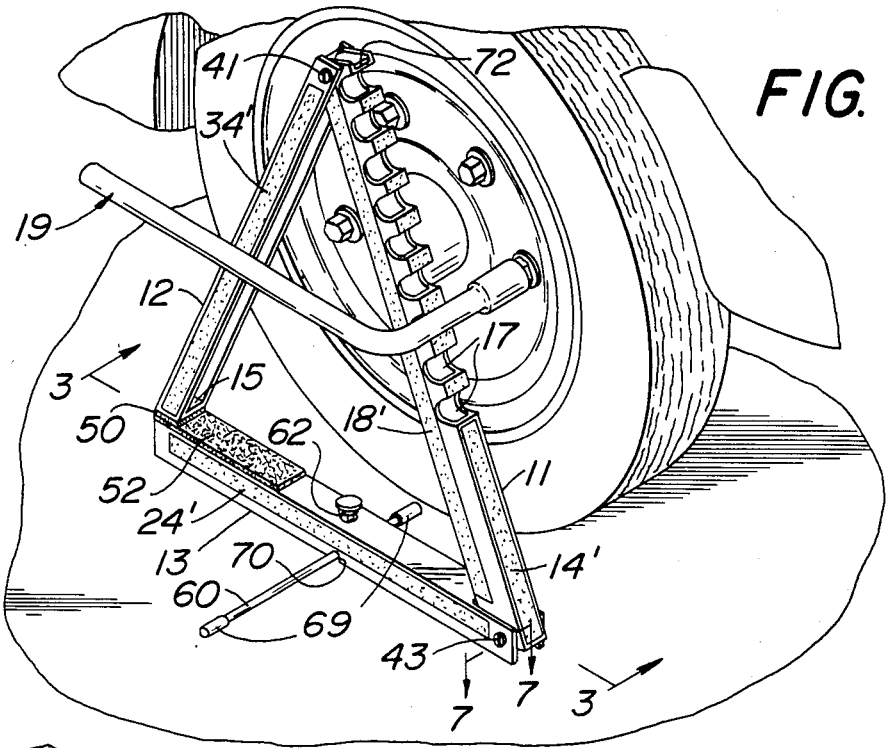
FIG. 1
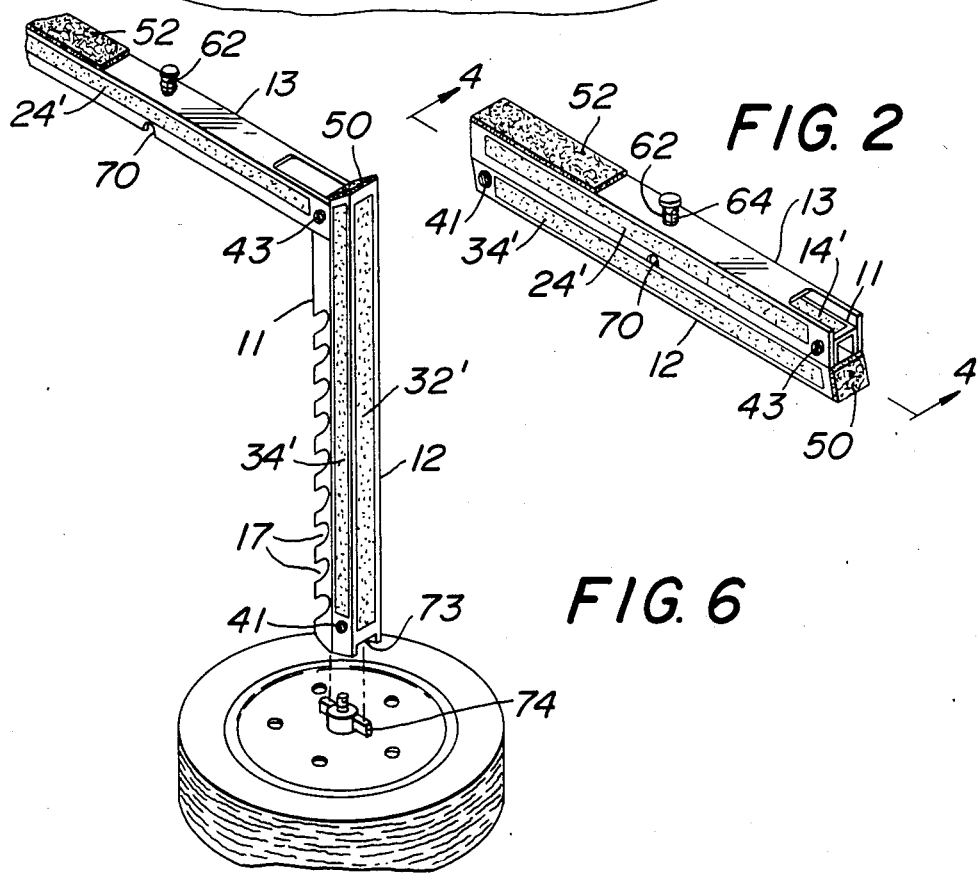
FIG. 2
FIG. 6

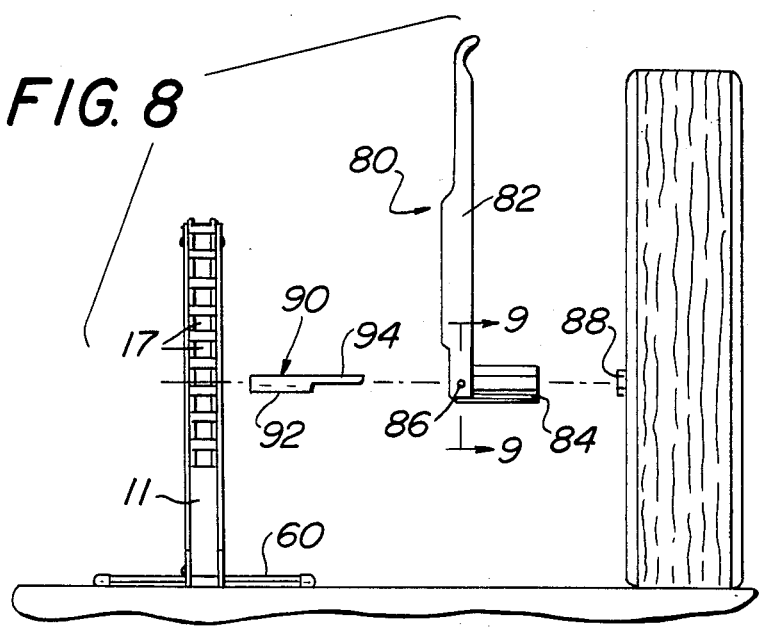
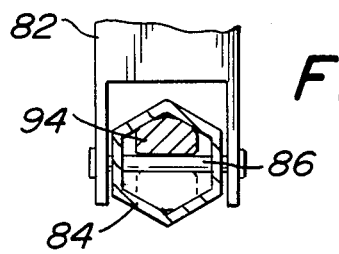
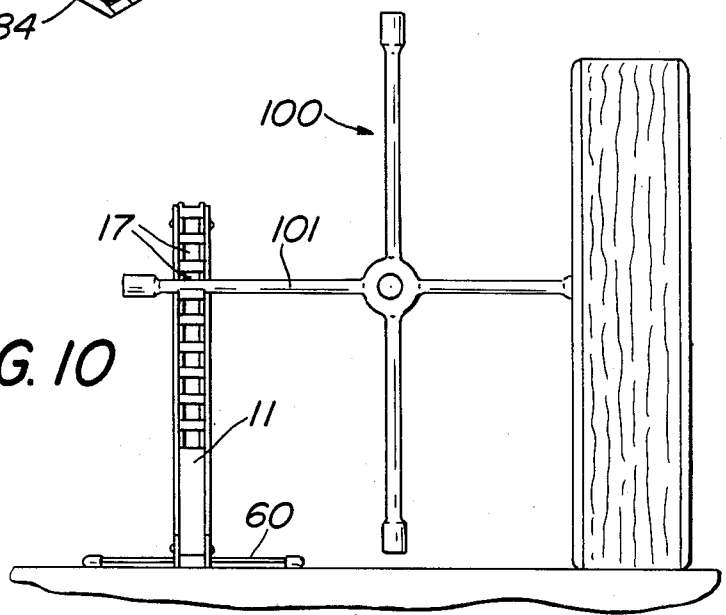

LUG REMOVAL/INSTALLATION DEVICE

BACKGROUND AND SUMMARY OF THE INVENTION

This invention relates to a device for use in conjunction with a lug wrench in the removal or installation of vehicle wheel lugs.

The difficulties of removing the wheel lugs of vehicles such as automobiles or trucks is well known and results from the substantial force required to be used to rotate the wheel lug by the use of a lug wrench. Even greater problems are faced by individuals who are physically weaker than the average male driver, such as elderly and disabled persons, etc.

The devices of the invention is adapted to be used in conjunction with the standard lug wrenches in general use today. In the use of present-day lug wrenches, the physical force applied to the wrench by the user is divided between the functions of (1) holding the lug wrench onto the lug and (2) providing the force required to turn the lug for loosening. The device of the invention provides a support for a horizontal portion of the lug wrench so that it is easily held onto the lug during the use thereof and the entire force applied by the user is directed to the sole purpose of turning the lug.

Briefly stated, the device of the invention comprises a main vertical support member, a secondary vertical support member, and a base member. A first pivot means is provided to pivotally connect the main vertical support member and the secondary vertical support member at end portions thereof and a second pivot means is provided for pivotally connecting the main vertical support member to the base member of end portions thereof. There is provided means for releasably fastening the free end portions of the base member and the secondary support member for positioning the members of the device in a triangular configuration with the base member supported on the ground and the vertical support members extending upwardly therefrom. The main vertical support member has a plurality of slots therein spaced apart along the length thereof and providing bearing surfaces for holding a horizontally extending portion of the lug wrench during the removal or installation of a vehicle wheel lug.

The device of the invention includes various novel features over similar devices in the prior art as disclosed in U.S. Pat. Nos. 2,447,919; 2,911,867; 2,960,895; 3,069,945; 3,097,550, 3,158,050, 3,832,917 and 4,300,412. The novel features of the device of the invention are set forth below:

(1) The device of the invention can be used as a triangular shaped "road hazard warning device" by means of reflective material being attached to the outwardly facing walls of the members.

(2) The device of the invention can be set up for use very quickly, such as in about five seconds or less.

(3) The device of the invention incorporates the use of a novel hook and loop type fastener for providing the releasable fastening between the base member and the secondary vertical support member.

(4) The device of the invention can be folded together into a collapsed condition for storage.

(5) The device of the invention is provided with a novel portion for use in loosening and/or tightening wing-nut type fasteners used to secure the spare tire and related jacking components in the vehicle storage compartment.

(6) The device of the invention can be carried easily in its collapsed condition.

(7) With the device of the invention, minor lug height adjustments can be made by adjusting the angle at which the vertical support members extend from the base member.

(8) The device of the invention can be used with the smallest of wheels or with flat tires since it can be easily adapted for use as low as two inches from the ground.

(9) The device of the invention incorporates a special rod that has one end shaped to allow it to be used with the swivel-head type lug type wrench provided with some small and midsize vehicles.

(10) The device of the invention can be made much smaller than any of the prior art devices.

When the device is closed it can be as small as $2\frac{1}{4}$ inches by $1\frac{1}{4}$ inches by 16 inches long. The size of the device enables it to be stored easily under the front seat or in the trunk of almost any automobile.

(11) The device of the invention can be manufactured from readily available materials, such as aluminum or plastic channel, at a very low manufacturing cost.

(12) The device of the invention is made in one operational unit with all the members being connected together so that there are no parts to be lost.

(13) The device of the invention is very simple to understand and safe to use and it can be used by almost anyone with very little instruction.

(14) The device of the invention has no moving parts to slide up or down so that there is nothing to become jammed or to tighten or to loosen whereby there is nothing to rattle around under the seat or in the truck of a vehicle.

(15) The device of the invention is self supporting so that the user does not have to hold the device in an upright position before, during or after each lug is loosened or tightened.

BRIEF DESCRIPTION OF THE DRAWINGS

FIG. 1 is a perspective view of the lug removal/installation device of the invention positioned for use in the loosening or removing of lugs from a automobile in conjunction with a standard automobile lug wrench of the type used with General Motors vehicles.

FIG. 2 is a perspective view showing the device of the invention in its closed or folded together position, such as for storage purposes.

FIG. 6 is a view illustrating the manner in which the device of the invention is used to cooperate with wing-nut fasteners used to secure the spare tire in the storage compartment of a vehicle.

FIG. 8 is a elevational view showing the use of the device to loosen or tighten lugs by using a swivel-head type of lug wrench and its use in conjunction with a novel adapter rod provided in accordance with the invention.

FIG. 9 is a sectional view taken on line 9—9 of FIG. 8.

FIG. 10 is an elevational view of a device in accordance with the invention arranged to be used to loosen or tigthen lugs using a T-bar type of lug wrench.

DETAILED DESCRIPTION OF THE PREFERRED EMBODIMENTS

Figure 5:
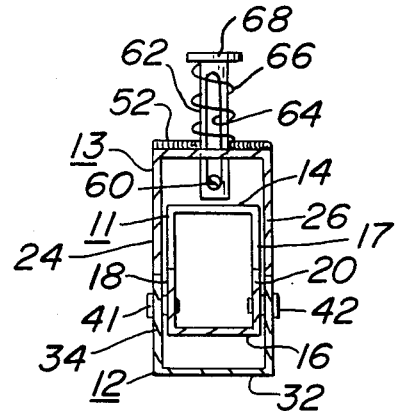
FIG. 5 is a sectional view taken generally on line 5—5 of FIG. 4.

Referring initially to FIG. 1, the three main supporting components of the device of the invention comprise a main vertical support member 11, a secondary vertical support member 12 and a base member 13. As best shown in FIG. 5, support member 11 is made of a channel member having a rectangular cross-section comprising a top wall 14, a bottom wall 16 and a pair of side walls 18 and 20. Base member 13 is made of a channel member having a U-shaped cross-section comprising a base 22 extending between a pair of side walls 24 and 26. Support member 12 is made of a channel member having a U-shaped cross-section including a base 32 extending between a pair of side walls 34 and 36. The member 11, 12 and 13 are made of a strong lightweight material such as steel, aluminum, plastic or a composite material.

Figure 7:
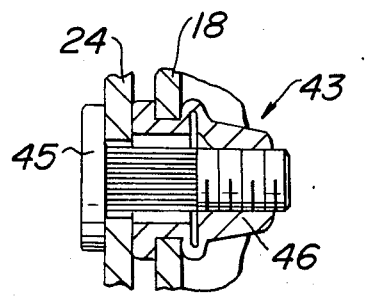
FIG. 7 is a fragmentary sectional view taken generally on line 7—7 of FIG. 1 and showing the pivot means for interconnecting the base member and the main vertical support member.

A first pivot means is provided to pivotally connect the main vertical support member 11 and the secondary vertical support member 12 at end portions thereof. The first pivot means comprises a pair of pivot fasteners 41 and 42 each of which pivotally interconnects opposed side wall portions of the members 11 and 12. Second pivot means is provided for pivotally connecting the main vertical support member 11 and the base member 13 at end portions thereof. The second pivot means comprises a pair of pivot fasteners 43 and 44 arranged to pivotally interconnect opposed side wall portions of the main support 11 and base member 13. In FIG. 7, there is shown a detail showing of the pivot fasteners used in the first and second pivot means. Each of these fasteners comprises a bolt 45 which is screwed into a blind threaded insert 46 mounted on the side wall of support member 11. These fasteners are available in the art and are known as "RIVNUT" fasteners. The fasteners are assembled by screwing the bolt 45 into the insert 46 to achieve a condition as shown in FIG. 7.

Figure 3:
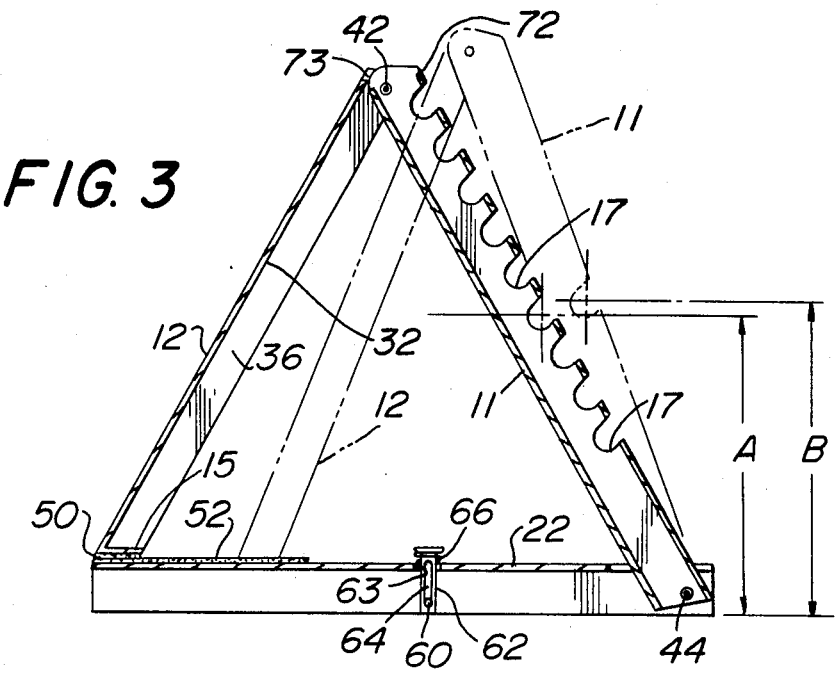
FIG. 3 is a sectional view of the device of the invention taken generally on line 3—3 of FIG. 1 and illustrating the various positions of the vertical support members.

In accordance with the invention there are provided novel means for providing releasable fastening between the free end portions of base member 13 and secondary support member 12 for positioning the three members 11, 12 and 13 in a triangular configuration with base member 13 supported on the ground and the vertical support members 11 and 12 extending upwardly therefrom with the first pivot means being located at the upper apex of the triangular configuration (as shown in FIGS. 1 and 3). Such means comprises a hook and loop type of fastener including a hook containing strip and a loop containing strip. In the device of the invention a "Velcro" type of hook and loop fastener is used with one strip 50 being secured, by means of adhesive, to the outer face of an end wall 15 at the free end of support member 12. The other strip 52 of these fastener strips is secured on the base wall 22 of base member 13, by adhesive, at the free end thereof. Strip 52 extends for a substantial extent along base wall 22 so that the free end of the secondary vertical support member 12 can be engaged at various positions along the length of the base member 13 to thereby vary the angle at which the main and vertical support members 11 and 12 extend upwardly from base member 13 (See FIG. 3).

FIG. 3 shows the device as set in two positions and shows the differences of the angles at which support members 11 and 12 extend upwardly from base member 13 in these positions. The solid line position shown in FIG. 3 is the ideal position to be used when the device is to function as a road hazard warning device. In this position the three members 11, 12 and 13 present a generally equilateral triangular configuration of the type typically used by road hazard warning devices. The dashed line position of FIG. 3 shows support member 12 in a more upright position which is preferable when the device is used in conjunction with a lug wrench for the removal or installation of vehicle wheel lugs as will be described more fully hereafter. It is noted that the shear strength of the hook and loop type fastener is increased as the support members 11 and 12 assume a more vertical or upright position.

Main vertical support member 11 has a plurality of slots 17 therein spaced apart along the length thereof and providing bearing surfaces for holding a horizontally extending portion of a lug wrench during the removal or installation of a vehicle wheel lug. In the embodiment of the invention described herein, there are provided nine slots 17 spaced apart equally along the length of support member 11 as is shown in the Drawings. The slots 17 extend inwardly from the top wall 14 of support member 11 and have a rounded innermost portion to provide a bearing surface which provides a secure support on the lug wrench which generally has a round or cylindrical cross-section.

FIG. 3 illustrates the manner in which minor lug height adjustments can be made by adjusting the angle of the support members 11 and 12. Thus, in the solid line position the horizontally extending portion of the lug wrench in the fourth slot 17 from the bottom would be supported on an axis which is a height "A" above the ground, whereas in the dashed line position this horizontally extending portion of the lug wrench would be supported a height "B" above the ground. Support members 11 and 12 can be positioned at an infinite number of positions between the solid and dashed line positions shown in FIG. 3 to therefore achieve minor lug height adjustments of the device.

The device is provided with a support rod 60 which is carried on base member 13 and is constructed and arranged to be set into a locked position on base member 13 so as to extend perpendicularly thereto along the ground to thereby maintain the device in an upright standing position during the use thereof. Support rod 60 is slidably mounted on the lower end of a pin 62 which is mounted on the base wall 22 of base member 13 at a generally central location along the length thereof. Pin 62 extends through a hole 63 in base wall 22 into the interior of the channel formed within walls 22, 24 and 26 and has an elongated slot 64 therein which slidably receives the support rod 60. A coil spring 66 is mounted in compression between the head 68 of pin 62 and the outer surface of base wall 22 of base member 13 whereby pin 62 is biased to the upward position as shown in FIG. 5. Rubber tips 69 are mounted on the ends of support rod 60. A pair of notches 70 are milled into the side walls 24 and 26 of base member 13 in alignment with the hole 63 in which the pin 62 is mounted.

Figure 4:
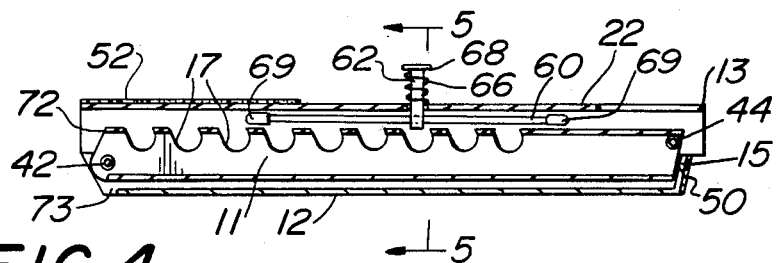
FIG. 4 is a sectional view taken generally on line 4—4 of FIG. 2.

The parts are constructed and arranged so that support rod 60 can be moved between the contained position shown in FIGS. 4 and 5 and the extended position shown in FIGS. 1 and 3. To move the support rod 60 from the contained position in the channel of base member 13 to the extended position, the user pushes on the head 68 of pin 62 to compress the spring 66 an amount sufficient to allow the support rod 60 to be turned 90° and positioned in the notches 70 in the side walls 24 and 26 of base member 13. The support rod 60 can then be slid through the bore 44 in the pin 62 perpendicularly to base member 13 to a position such that the device can be positioned as close as needed to the vehicle wheel during a lug removal or installation operation. This position is illustrated in FIG. 1.

By reason of the generally rectangular cross-sectional configuration of the members 11, 12 and 13 as described above, when the device is supported in its standing triangular configured position as shown in FIGS. 1 and 3, the members 11, 12 and 13 provide a plurality of outwardly facing surfaces. Support member 11 presents three outwardly facing surfaces on the exterior of walls 14, 18 and 20, support member 12 presents three outwardly facing surfaces on the exterior of walls 32, 34 and 36 and base member 13 presents two outwardly facing surfaces on the exterior of side walls 24 and 26. As shown in the Drawings each of these outwardly facing surfaces is provided with a light reflective strip, these strips being given reference numerals corresponding to their associated walls with primes added. Thus, member walls 14, 18, 20, 32, 34, 36 and 24 and 26 are provided with reflective strips 14', 18', 20', 32', 34', 36', 24' and 26', respectively. It will be apparent that by reason of the above-described construction, the provision of the reflective strips enables the device to be used as a road hazard means. In this use of the device the members 11, 12 and 13 will normally be mounted to present a generally equilateral triangular configuration as shown in the solid line position of FIG. 3.

In accordance with the invention, the parts are constructed and arranged so that members 11, 12 and 13 can be pivoted to be folded together with main vertical support member 11 contained in the interior channels provided by U-shaped channel members 12 and 13 in a collapsed condition of the device which is shown in FIGS. 2, 4 and 5. This is achieved by the arrangement of the pivot means and by having support member 11 of a size and rectangular shape such that the interior channel provided by the U-shaped support member 12 is adapted to contain a portion of support member 11 and the interior channel provided by the U-shaped base member 13 is adapted to contain the remaining portion of support member 11 when the parts are folded together as shown in the Drawings.

In the collapsed condition of the device, support rod 60 is also contained within the interior channel of base member 13 as is shown in FIGS. 4 and 5. Pin 62 is arranged to be aligned with one of the slots 17 in member 11 so as to avoid interferring contact between the pin 62 and the support member 11 when the parts are positioned in the collapsed position whereby pin 62 can be moved to a depressed position for shipping and storage purposes.

The use of the device in accordance with the invention for the installation or removal of vehicle wheel lugs will be described with respect to the showing of FIG. 1. In the use of the device, after the lug wrench 19 is positioned on the wheel lug to be removed or tightened, the members 11, 12 and 13 are positioned in a triangular configuration with support rod 60 extended as is shown in FIG. 1 and moved close to the vehicle wheel. The lug wrench 19 is then maneuvered to place the horizontal portion thereof extending from the lug onto the bearing surface provided by the slot 17 which is most closely aligned therewith. Minor adjustments in the angle of support members 11 and 12 can be made to achieve good alignment. This position is shown in FIG. 1. The user then can apply a force to the lug wrench 19 to cause the turning of the lug as desired. During the application of this force, the device of the invention provides the vertical support for the lug wrench 19 so that the entire force applied by the user is directed to the turning of the lug.

FIG. 6 illustrates the manner in which the device of the invention can be used to remove and install wing nut fasteners of the type used to hold down the spare tire of a vehicle. To this end, the end portions of vertical support members 11 and 12 whereat they are pivotally connected are each provided with a generally rectangular recess 72 and 73, respectively. The recesses 72 and 73 are adapted to receive a wing nut or the like so as to engage the same. The manner in which the device of the invention is used is shown in FIG. 6 wherein the members 11 and 12 are pivoted to form a straight leg with base member 13 extending perpendicularly therefrom. By this arrangement, the device of the invention can be used much like a conventional wrench to remove the wing nut 74.

FIGS. 8 and 9 illustrate the manner in which the device of the invention can be used with a swivel-head type of lug wrench that is in use today. This type of lug wrench, indicated generally at 80, comprises a handle 82 which is pivotally connected at one end to a hollow hexagonal-shaped lug engaging member 84 by means of a pivot pin 86. In accordance with the invention, there is provided an adapter rod 90 which has a round portion 92 and a multi-sided portion 94. Portion 94 is configured so as to be received in the interior of the lug engaging member 84 so as to be wedged between the pivot pin 86 and the interior wall of the hexagonal lug engaging member 84 as is shown in FIG. 9. Portion 94 can assume either the solid line or a dashed line position shown in FIG. 9 and fits securely in tight contact with two walls of member 84 and with pin 86 so as to provide an elongated extension from the lug engaging member 84, which extension is adapted to be received at its round portion 92 in the slots 17 formed in support member 11.

In the use of the device shown in FIGS. 8 and 9, the adapter rod 90 is inserted into the end of the lug wrench 80 to a position as shown in FIG. 9 and the lug engaging portion 84 is engaged on the wheel lug 88 to be removed. The adapter rod 90 is then positioned in the appropriate aligned slot 17 on the support member 11 with the round portion 92 being in contact with the bearing surface provided thereby in the same manner as described with respect to the FIG. 1 embodiment. The wrench 80 can then be operated by the application of force to the handle 82 to effect a lug tightening or removal operation.

FIG. 10 illustrates the manner in which the device of the invention can be used with a conventional T-bar type of lug wrench, indicated generally at 100. In use, the T-bar lug wrench 100 is positioned in engagement with the lug to be removed or tightened. After this, the T-bar 100 is positioned with a horizontal leg 101 thereof supported in the appropriate slot 17 on the support member 11 of the device of the invention, with the horizontal leg 101 thereof resting on the bearing surface provided by the slot 17. This position is shown in FIG.

10. The user then applies a force to the vertical arms of the lug wrench 100 to effect the turning of the lug for removing or tightening the same as desired.

It will be apparent that various changes may be made in the construction and arrangement of the parts of the device of the invention without departing from the scope thereof as defined by the following claims.

What is claimed is:

1. A device for use in conjunction with a lug wrench in the removal or installation of vehicle wheel lugs comprising:
    a main vertical support member having a pair of pivoted end portions,
    a secondary vertical support member having a pivoted end portion and a free end portion,
    a base member having a pivoted end portion and a free end portion, said base member having a substantial base width to provide a ground contacting support portion of substantial width on a bottom side thereof,
    a first pivot means pivotally connecting said main vertical support member and said secondary vertical support member together of said pivoted end portions thereof,
    second pivot means for pivotally connecting said main vertical support member and said base member together at said pivoted end portions thereof,
    means for releasably fastening the free end portion of said base member to the free end portion of said secondary support member for positioning said members in a ground supported standing triangular configuration with said base member supported on the ground at said ground contacting support portion of said bottom side to form the bottom leg of said triangular configuration and said vertical support members extending upwardly from said base member to form the other two legs of said triangular configuration with said first pivot means being located at the upper apex of said triangular configuration, said second pivot means being located at a lower apex of said triangular configuration adjacent ground level and adjacent said ground contacting support portion,
    said main vertical support member having a plurality of slots therein spaced apart along the length thereof and providing bearing surfaces for holding a horizontally extending portion of the lug wrench during the removal or installation of a vehicle wheel lug.

2. A device for use in conjunction with a lug wrench in the removal or installation of vehicle wheel lugs comprising;
    a main vertical support member,
    a secondary vertical support member,
    a base member,
    a first pivot means pivotally connecting said main vertical support member and said secondary vertical support member at end portions thereof,
    second pivot means for pivotally connecting said main vertical support member and said base member at end portions thereof,
    means for releasably fastening the free end portions of said base member and said secondary support member for positioning said members in a triangular configuration with said base member supported on the ground and said vertical support members extending upwardly therefrom with said first pivot means being located at the upper apex of said triangular configuration,
    said main vertical support member having a plurality of slots therein spaced apart along the length thereof and providing bearing surfaces for holding a horizontally extending portion of the lug wrench during the removal or installation of a vehicle wheel lug,
    said means for fastening said base member and said secondary vertical support member comprising a hook and loop fastener means including a hook containing strip and a loop containing strip, one of said strips being secured at the free end of said secondary support member and the other of said strips being secured on the wall of said base member facing the free end of said secondary support member with said members in said triangular configuration.

3. A device according to claim 2 wherein said other strip extends for a substantial horizontal extent so that said free end of said secondary vertical support member can be fastened at various positions along the length of said base member to thereby vary the angles at which said main and vertical support members extend upwardly from said base member.

4. A device according to claim 3 including a support rod carried by said base member adapted to be set into a locked position on said base member with said support rod extending perpendicularly to said base member along the ground on which the base member rests to thereby maintain said triangular configuration of members in an upright standing position.

5. A device for use in conjunction with a lug wrench in the removal or installation of vehicle wheel lugs comprising:
    a main vertical support member,
    a secondary vertical support member,
    a base member,
    a first pivot means pivotally connecting said main vertical support member and said secondary vertical support member at end portions thereof,
    second pivot means for pivotally connecting said main vertical support member and said base member at end portions thereof,
    means for releasably fastening the free end portions of said base member and said secondary support member for positioning said members in a triangular configuration with said base member supported on the ground and said vertical support members extending upwardly therefrom with said first pivot means being located at the upper apex of said triangular configuration,
    said main vertical support member having a plurality of slots therein spaced apart along the length thereof and providing bearing surfaces for holding a horizontally extending portion of the lug wrench during the removal or installation of a vehicle wheel lug,
    each of said members having a generally rectangular cross-sectional configuration whereby when the device is supported in its standing triangular configured position, said support members each providing three outwardly facing surfaces and said base member provides two outwardly facing surfaces, and including a plurality of light reflective strips, substantially all of said outwardly facing surfaces of said members having light reflective strips secured thereto whereby said device can be used as a road hazard means.

6. A device for use in conjunction with a lug wrench in the removal or installation of vehicle wheel lugs comprising:
a main vertical support member,
a secondary vertical support member,
a base member,
a first pivot means pivotally connecting said main vertical support member and said secondary vertical support member at end portions thereof,
second pivot means for pivotally connecting said main vertical support member and said base member at end portions thereof,
means for releasably fastening the free end portions of said base member and said secondary support member for positioning said members in a triangular configuration with said base member supported on the ground and said vertical support members extending upwardly therefrom with said first pivot means being located at the upper apex of said triangular configuration,
said main vertical support member having a plurality of slots therein spaced apart along the length thereof and providing bearing surfaces for holding a horizontally extending portion of the lug wrench during the removal or installation of a vehicle wheel lug,
said main vertical support member having a generally rectangular cross-sectional configuration, said secondary vertical support member having a U-shaped channel configuration providing a channel adapted to contain a portion of said main vertical support member, and said base member having a U-shaped channel configuration providing a channel adapted to contain another portion of said main vertical support member, said first and second pivot means being constructed and arranged so that said members can be pivoted to be folded together with said main vertical support member contained in said channels between said secondary vertical support member and said base member in a collapsed condition.

7. A device according to claim 1 wherein said main vertical support member is made of a hollow rectangular tube configuration, each of said slots having a pair of spaced apart bearing surfaces located in opposite walls of said rectangular tube configuration.

8. A device according to claim 1 wherein the end portions of said main and secondary vertical support members whereat they are pivotally connected are each provided with a cut-out extending across the ends thereof to form a generally rectangular recess, said recess being adapted to receive and engage the wing portions of a wing nut or the like for use in removing the same from a holddown position in a vehicle or the like.

9. A device according to claim 1 including a support rod carried by said base member adapted to be set into a locked position on said base member with said support rod extending perpendicularly to said base member along the ground on which the base member rests to thereby maintain said triangular configuration of members in an upright standing position.

10. A device for use in conjunction with a lug wrench in the removal or installation of vehicle wheel lugs comprising;
a main vertical support member,
a secondary vertical support member,
a base member,
a first pivot means pivotally connecting said main vertical support member and said secondary vertical support member at end portions thereeof,
second pivot means for pivotally connecting said main vertical support member and said base member at end portions thereof,
means for releasably fastening the free end portions of said base member and said secondary support member for positioning said members in a triangular configuration with said base member supported on the ground and said vertical support members extending upwardly therefrom with said first pivot means being located at the upper apex of said triangular configuration,
said main vertical support member having a plurality of slots therein spaced apart along the length thereof and providing bearing surfaces for holding a horizontally extending portion of the lug wrench during the removal or installation of a vehicle wheel lug, and
a support rod carried by said base member adapted to be set into a locked position on said base member with said support rod extending perpendicularly to said base member along the ground on which the base member rests to thereby maintain said triangular configuration of members in an upright standing position,
each of said members having a generally rectangular cross-sectional configuration whereby when the device is supported in its standing triangular configured position said support members each provide three outwardly facing surfaces and said base member provides two outwardly facing surfaces, and including a plurality of light reflective strips, substantially all of said outwardly facing surfaces of said members having light reflective strips secured thereto whereby said device can be used as a road hazard means.

11. A device for use in conjunction with a lug wrench in the removal or installation of vehicle wheel lugs comprising:
a main vertical support member,
a secondary vertical support member,
a base member,
a first pivot means pivotally connecting said main vertical support member and said secondary vertical support member at end portions thereof,
second pivot means for pivotally connecting said main vertical support member and said base member at end portions thereof,
means for releasably fastening the free end portions of said base member and said secondary support member for positioning said members in a triangular configuration with said base member supported on the ground and said vertical support members extending upwardly therefrom with said first pivot means being located at the upper apex of said triangular configuration,
said main vertical support member having a plurality of slots therein spaced apart along the length thereof and providing bearing surfaces for holding a horizontally extending portion of the lug wrench during the removal or installation of a vehicle wheel lug,
said lug wrench being a swivel-head type including a handle, a hollow hexagonal-shaped lug engaging member, and means including a pivot pin for pivotally connecting one end of said handle to said lug engaging member, and including an adapter rod having a round portion and a multi-sided portion, said multi-sided portion being configured to be received securely in the interior of said lug engaging member to provide an elongated extension therefrom, said round portion being configured to be received in said slots in said main vertical support member.

12. A device according to claim 4 wherein said support rod is mounted for movement perpendicularly of said base member to adjust the supporting position thereof.

* * * * *